Figure 1:
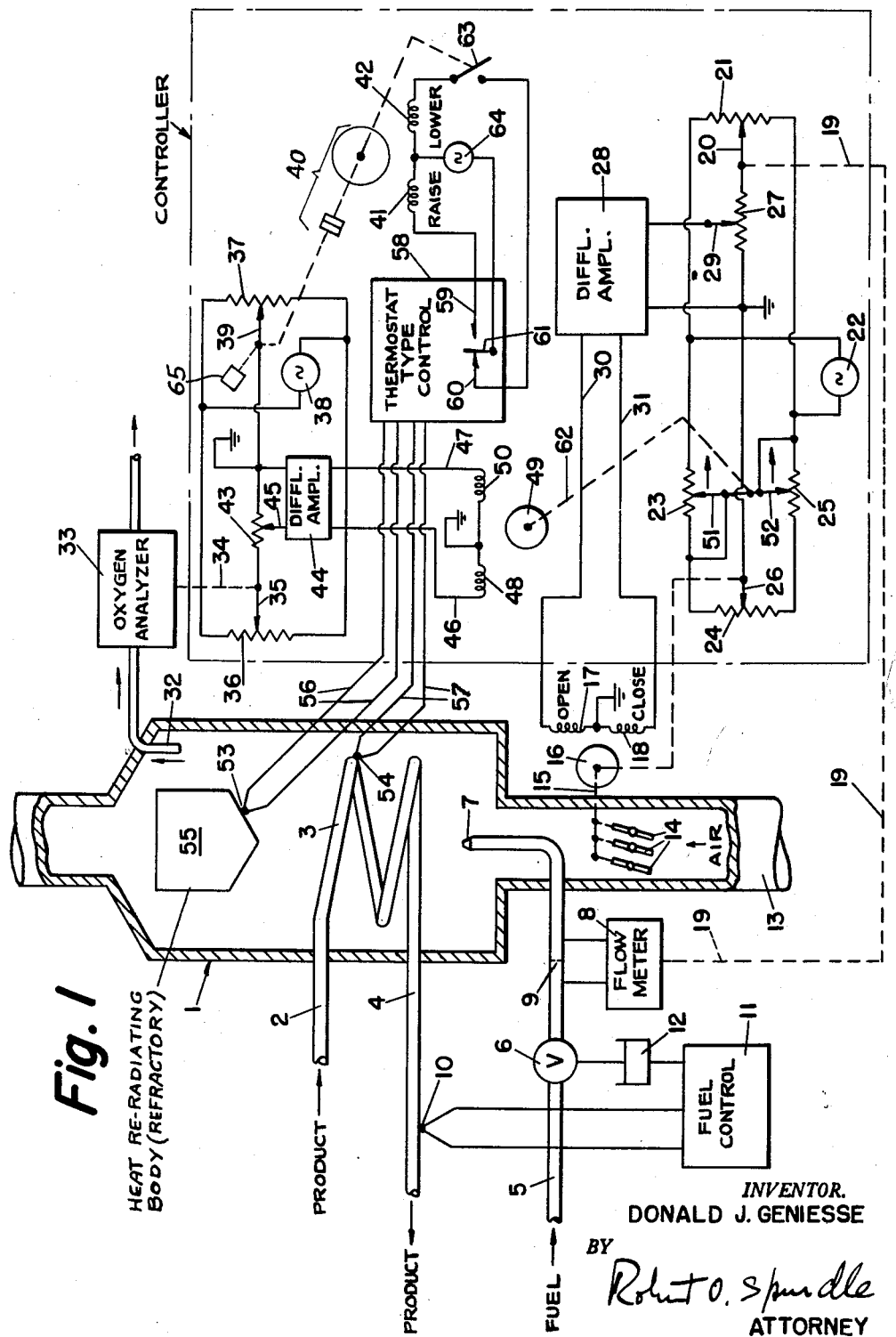

INVENTOR.
DONALD J. GENIESSE
BY
Robert O. Spindle
ATTORNEY

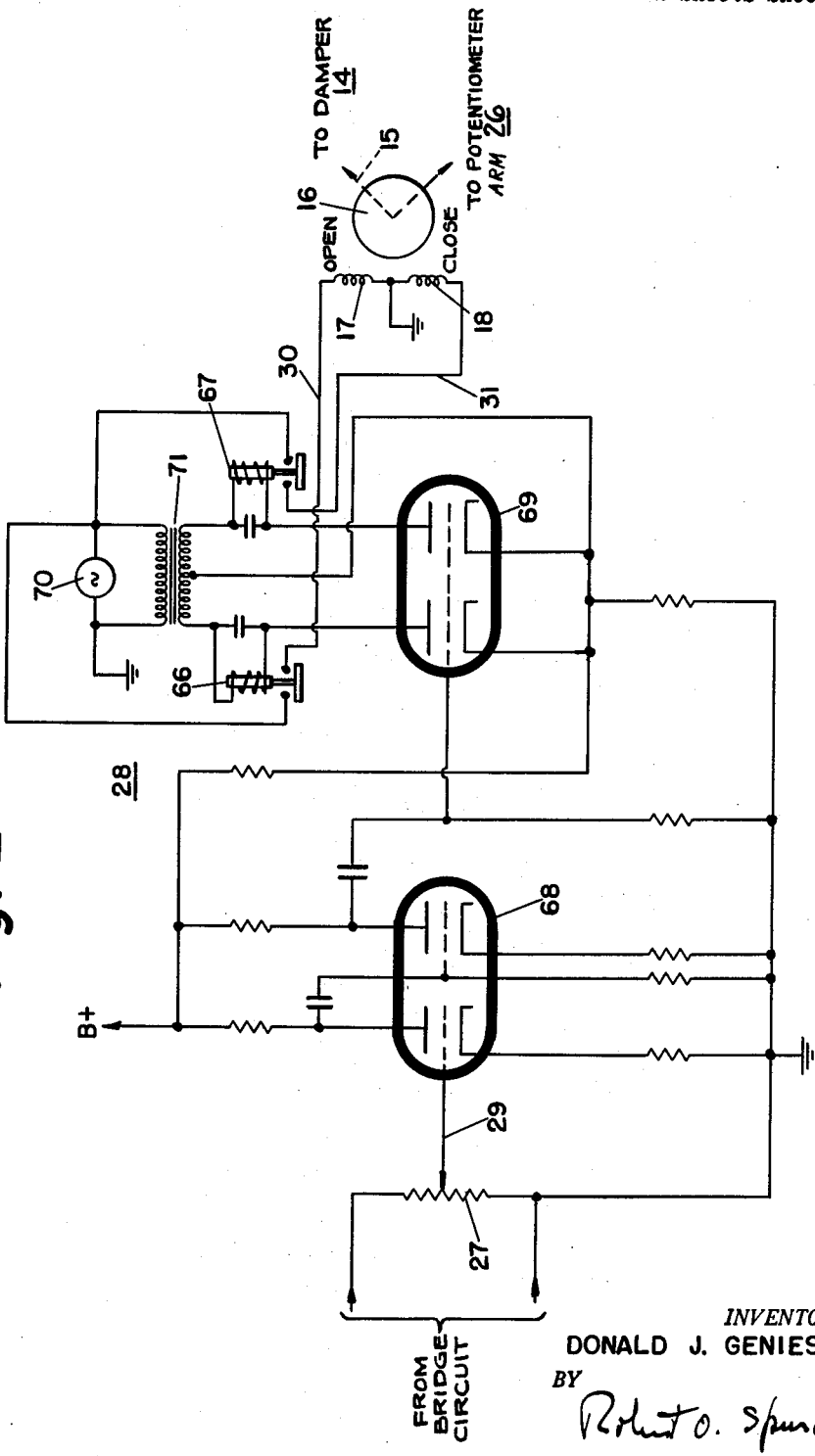

United States Patent Office 3,074,644
Patented Jan. 22, 1963

3,074,644
DAMPER CONTROL SYSTEM FOR PROCESS HEATERS
Donald J. Geniesse, West Chester, Pa., assignor to Sun Oil Company, Philadelphia, Pa., a corporation of New Jersey
Filed Feb. 24, 1960, Ser. No. 10,677
13 Claims. (Cl. 236—15)

This invention relates to a heater control system particularly adapted for use with a process furnace or heater, to enable the furnace or heater to operate at the highest practical thermal efficiency. A typical use of the present system is for the combustion control of a refinery process heater.

Speaking generally, the present invention constitutes an improvement over the system disclosed in my prior copending application, Serial No. 674,218, filed July 25, 1957, which ripened on April 18, 1961, into Patent No. 2,980,334.

The present trend in process heater design is toward complete radiant extraction, under conditions in which the flames are in close proximity to the tubes and setting. Most process heaters are controlled to maintain a substantially constant "product out" temperature. If the temperature at the product outlet drops, more fuel is introduced, and vice versa. This is the most important consideration in the control of the heater, and it is not desirable to modify this.

The control afforded by the present system is independent of the product temperature-fuel firing rate control previously referred to. The present system, instead, is a separate one which operates the heater at a preset low percentage of excess air under normal operating conditions, and which increases this percentage when the temperature inside the heater has exceeded some preset value.

Neglecting the effects of poor mixing at very low firing rates, the thermal efficiency is a function of the percentage of excess air, the term "excess air" referring to any air beyond the amount needed for complete combustion. The lower the percentage of excess air, the higher the thermal efficiency, and vice versa.

Any heater may conceivably be assigned a fixed (small) percentage of excess air, and may be expected to have a reasonably high thermal efficiency over a wide range of firing rates, at this percentage. A smaller percentage of firing rates, at this percentage. A smaller percentage of air may cause incomplete combustion, while a greater percentage of air would increase the heat losses through the stack.

For very high fuel firing rates, however, a small percentage of excess air may result in a larger and hotter flame, and although the thermal efficiency then becomes high, there is danger that the flame may become large enough and hot enough to overheat the tubes or the setting. In situations of this type, the practice has been to operate the heater at high excess air rates at all times and for all firing rates, to protect against overheating. This type of operation demands less attention, but it does promote excess fuel consumption and it does reduce thermal efficiency.

A general object of the present invention is to obviate the reduced thermal efficiency resulting from continuously providing a high percentage of excess air. In accordance with the invention, a continuous oxygen analyzer is used to produce an output signal which is proportional to the percentage of excess air in the heater. A fuel flowmeter is used to produce an output signal which is proportional to the rate of fuel flow into the heater. Temperature-sensitive devices are located in the radiant portion of the heater, at points where overheating may first be detected; these devices may be located on the tube walls, or on refractory surfaces, and may be located in accordance with the general design of the heater. The signals from the oxygen analyzer, the fuel flowmeter, and the temperature-sensitive devices are transmitted to a controller, the output of which controls a damper to regulate the amount of air entering the heater (whether there be either forced or natural draft).

In brief, the operation is as follows: the controller is preset (this may be a manual adjustment) to operate the heater with the minimum percentage of excess air conducive to proper combustion and maximum efficiency, at average firing rates. Process heat requirements are satisfied with the usual fuel control system or systems; this system varies the fuel firing rate as called for by changes in product outlet temperature. The signal from the fuel flowmeter causes the damper to open and close with variations in fuel flow rate, in such a way as to maintain an approximately correct fuel-air ratio. This damper modulation is substantially instantaneous, and prevents any serious air deficiency which could result from a lag in the action of the oxygen analyzer.

Since the fuel-flow-induced damper position only approximates the preset excess air percentage, and since variations in fuel heating value and in atmospheric pressure will tend to alter this approximation, the signal from the oxygen analyzer is used to reset the fuel flow-air flow portion of the controller, in such a way as to maintain the preset excess air percentage in the heater.

If a higher firing rate is called for by a drop in product outlet temperature, the flame may increase in temperature and size to an extent such that one or more of the temperatures measured will exceed a preset maximum. If at high firing rates the measured firebox temperatures exceed some preset maximum, the temperature-sensitive devices will transmit a signal to the controller to raise the excess air set point (thereby causing opening of the damper) to a value which will increase the percentage of excess air in the heater, thus lowering the temperature to the preset maximum. The controller then causes the heater to operate at or near the new excess air level. If the high firing rate is not maintained, the excess air set point is lowered, causing the damper to close. Ultimately, the system returns to the condition of the preset minimum percentage of excess air.

As long as the heater is operated in the manner described, the control system will maintain the lowest percentage of excess air possible, while not exceeding the maximum heater temperature.

A detailed description of the invention follows, taken in conjunction with the accompanying drawings, wherein:

FIGURE 1 is a combined structural and wiring diagram illustrating a preferred embodiment of the invention; and FIGURE 2 is a detailed circuit diagram of a differential amplifier which may be used in the system of FIGURE 1.

Referring now to FIGURE 1, a heater to which the control system of the invention may be applied is illustrated somewhat diagrammatically at 1. The product to be heated enters at 2 a tube system indicated at 3, and leaves the heater at 4. Fuel is introduced at 5 through a control valve 6 to a burner indicated at 7. Between valve 6 and burner 7, an orifice-type flowmeter 8 is connected into the fuel line. The orifice for this flowmeter is indicated at 9, and couplings for the flowmeter are made to the fuel line at respective opposite sides of this orifice, as indicated. The operation of flowmeter 8 will be described more in detail hereinafter; suffice it to say for the present that flowmeter 8 measures the flow of fuel to burner 7, that is, the fuel firing rate.

A temperature pickup e.g. a thermocouple 10, senses the product outlet temperature in pipe 4 and provides a control signal to a conventional fuel control 11 which operates the valve 6 through a motor device 12. The action of elements 10—12 and 6 is such as to maintain a substantially constant "product out" temperature. If the temperature at thermocouple 10 (at the product outlet) drops, a signal is transmitted to fuel control 11, this control then operating valve 6 to introduce more fuel to burner 7, i.e., to increase the fuel firing rate. If the temperature at thermocouple 10 rises, a reverse action (a decrease of the fuel firing rate) occurs. These changes of fuel flow in the line to burner 7 are of course sensed by flowmeter 8.

Air for combustion, under forced or natural draft, enters the furnace at 13, and is controlled by a damper 14 which is mechanically actuated (as indicated by the dotted line connection 15) by a reversible motor 16 (e.g., a two-phase alternating current motor) provided with windings 17 and 18 arranged to be respectively energized to open and close the damper. The common junction of windings 17 and 18 is connected to ground, as indicated. Items 1—7 and 10—18 may be entirely conventional, but the arrangement thereof may be considerably more elaborate than is shown, involving, possibly, a plurality of burners having separate fuel controls, multiple air inlets, or the like. The heater itself may take many forms commonly used in the art.

In accordance with the present invention, a mechanical transducer (indicated by the dotted line connection 19) is coupled to the flowmeter 8, this mechanical transducer actuating the movable arm 20 of a potentiometer 21, which latter is a part of the controller. The potentiometer 21 may be thought of as a variable resistance type of transducer, and the arm 20 thereof moves in proportion to the fuel flow into the heater 1, as sensed by flowmeter 8. An alternating current power source 22 is connected across the two ends of potentiometer 21. Also connected across source 22, in such a way as to form with potentiometer 21 an alternating current bridge, is the series combination of a potentiometric-type variable resistor 23, a potentiometer 24, and another potentiometric-type variable resistor 25. The movable arm 26 of the "damper slidewire" potentiometer 24 is mechanically driven by damper motor 16, so that the position of arm 26 is proportional to the opening of damper 14.

The arms 20 and 26 of potentiometers 21 and 24, respectively, are connected to respective opposite ends of a potentiometer 27 which provides the input to a differential amplifier 28. One end of potentiometer 27 (e.g., the end connected to arm 26) is grounded, and the input to amplifier 28 is taken between the movable arm 29 of potentiometer 27 and ground. The amplifier 28 is responsive to the phase and amplitude of the alternating current signal on potentiometer 27 (or, rather, to a portion of this signal, as selected by arm 29), to produce an energizing voltage (with respect to ground) on one or the other of the amplifier output leads 30 and 31, the particular output lead effective depending upon the phase of the alternating current signal across potentiometer 27. The operation of this amplifier will be described more in detail later, in connection with FIGURE 2. Lead 30 is connected to the ungrounded end of the "open" damper motor winding 17, while lead 31 is connected to the ungrounded end of the "close" motor winding 18. Therefore, as a result of the above-described operation of amplifier 28, the output of this amplifier causes the damper motor 16 to open, close, or stop the movement of, the damper 14, depending on the phase and amplitude of the alternating current signal across potentiometer 27.

That portion of the controller previously described operates in the fashion of a first self-balancing alternating current bridge. For example, if the fuel flow to the burner increases, the arm 20 of potentiometer 21 moves upward (in response to the urging of flowmeter 8), unbalancing the bridge and producing an increasing alternating current potential across potentiometer 27. This potential will cause the amplifier 28 to energize the damper motor 16 (by way of lead 30) to open the damper 14, the damper motor 16 then driving the arm 26 of potentiometer 24 upward to rebalance the bridge, this action continuing until the potential across potentiometer 27 becomes a minimum. The reverse action occurs when the fuel flow to the burner decreases. Thus, when the fuel firing rate varies (as a result of the action of the fuel control system 11, etc. described hereinabove), the damper is varied accordingly, in such a way as to maintain an approximately correct fuel-air ratio. This operation prevents any serious air deficiency, since the fuel-flow-induced damper modulation is substantially instantaneous.

Combustion gases are sampled at 32 by an oxygen analyzer 33. This analyzer may be of any conventional type providing an output in accordance with the oxygen content of the stack gases, being for example of the type involving the burning of hydrogen, of the type involving utilization of the magnetic susceptibility of oxygen, or of other type. For the purpose of the present invention, the output (indicator) shaft 34 of the analyzer drives the movable arm 35 of a potentiometer 36. The arm 35 is caused to move in proportion to the percentage of oxygen in the heater 1, as determined by the analyzer 33. In this connection, it is pointed out that the percentage of oxygen in the heater is directly proportional to the excess air percentage in the heater.

A "set point" potentiometer 37 is connected in parallel with potentiometer 36, across an alternating current power source 38, so that the two potentiometers form a second alternating current bridge. The arm 39 of potentiometer 37 can be moved either manually (as by a knob 65 coupled to the potentiometer shaft) or by a reversible motor 40 (e.g., a two-phase alternating current motor) provided with windings 41 and 42 arranged to be respectively energized to raise and lower the set point. The motor 40 includes a friction-type overriding clutch mechanism (shown schematically) which couples this motor to the same potentiometer shaft operated by knob 65. The manual movement of arm 39 enables the oxygen set point to be preset, which presets the excess air percentage in the heater.

The arms 39 and 35 of potentiometers 37 and 36, respectively, are connected to respective opposite ends of a potentiometer 43 which provides the input to a differential amplifier 44. One end of potentiometer 43 (e.g., the end connected to arm 39) is grounded, and the input to amplifier 44 is taken between the movable arm 45 of potentiometer 43 and ground. The amplifier 44 is responsive to the phase and amplitude of the alternating current potential on potentiometer 43 (or, rather, to a portion of this potential, as selected by arm 45), to produce an energizing voltage (with respect to ground) on one or the other of the amplifier output leads 46 and 47, the particular output lead effective depending upon the phase of the alternating current potential across potentiometer 43. Amplifier 44 may also be of the form illustrated in FIGURE 2. Lead 46 is connected to one end of one winding 48 of a reversible motor 49 (e.g., a two-phase alternating current motor), while lead 47 is connected to one end of the second winding 50 of motor 49. The junction of windings 48 and 50 is connected to ground. As a result of the above-described operation of amplifier 44, the output of this amplifier causes the motor 49 to turn in either direction or stop, depending on the phase and amplitude of the alternating current potential across potentiometer 43. The two potentiometers 36 and 37, connected in the manner described across an alternating current source, operate in the fashion of a second self-balancing alternating current bridge.

If the oxygen content of the combustion gases, as sensed by oxygen analyzer 33, varies (as might happen, for example, when the atmospheric pressure changes), the arm 35 of potentiometer 36 moves (in response to actuation by output shaft 34), unbalancing the bridge and producing a significant alternating current potential across potentiometer 43. This potential will cause the amplifier 44 to energize the motor 49, either by way of lead 46 or lead 47. The motor 49 will then rotate in one direction or the other, depending on whether its winding 48 or its winding 50 is energized, which depends in turn on the relative phase of the alternating current potential produced across potentiometer 43.

The movable arms 51 and 52 of variable resistors 23 and 25, respectively, are ganged together and are mechanically driven by motor 49, as indicated at 62. For one particular direction of rotation of motor 49, these arms are driven in the directions indicated by the arrows adjacent the arms; in this direction, the effective resistance of resistor 23 decreases, while that of resistor 25 increases. It should be apparent that for the other direction of rotation of motor 49, the effective resistance of resistor 23 would increase, while that of resistor 25 would decrease. Thus, when the reversible motor 49 is caused to rotate (in the manner described in the preceding paragraph), the variable resistors 23 and 25 are driven in a manner to cause the total resistance of resistor 23, potentiometer 24, and resistor 25 (which are all connected in series across the alternating current supply 22) to remain constant; however, the alternating current potential at the arm 26 of potentiometer 24 is changed. The first-described of the two alternating current bridges thus becomes unbalanced, producing a significant potential across potentiometer 27. Then, amplifier 28 energizes the damper motor 16, which moves damper 14 in such a way as to cause the excess air percentage in the heater to return to the value preset on potentiometer 37. In this connection, it will be recalled that the described energization of motor 49 (and the consequent energization of motor 16) was predicated on the assumption that the oxygen content of the combustion gases varied. When the excess air percentage in the heater returns to the preset value, the ensuing change in oxygen content is sensed by oxygen analyzer 33, moving the arm 35 back and rebalancing the second-described of the two alternating current bridges. Thus, as described, the signal from the oxygen analyzer is used to reset the fuel flow-air flow portion (potentiometer 21, etc.) of the controller, in such a way as to maintain the preset excess air percentage in the heater 1.

One or more temperature pickup elements, such as thermocouples 53 and 54, are provided at critical points where the attainment of excess (dangerous) temperatures may be expected to appear first, in the event that the flame becomes too large or too hot. For example, thermocouple 53 may be mounted on the refractory body 55 customarily present at the top of the furnace 1, while thermocouple 54 may be mounted on the product tube 3. The thermocouples 53 and 54 provide their signals through the respective leads 56 and 57 to a thermostatic type temperature control unit 58. For simplicity of description, detailed reference will be made only to the thermocouple 53 and its leads 56, but it will be understood that other thermocouples such as 54 may be connected to the same temperature control unit 58, or a separate temperature control unit (any of which would operate the motor 40, in the manner to be described hereinafter) may be used for each thermocouple. In the event that a single temperature control unit is used for two (or more) thermocouples, the several thermocouples would utilize the same control unit on a time-sharing basis.

The temperature control unit 58 may comprise, for example, a temperature recorder the moving element of which is coupled to lead 56, so as to be responsive to the potential across the thermocouple 53. This temperature recorder has embodied therein a single-pole, double-throw switch including two fixed contacts 59 and 60, and a movable contact 61. This switch is actuated by the moving element of the temperature recorder in such a way that when the temperature sensed by thermocouple 53 exceeds a preset value (say, 1400° F.), contacts 59 and 61 are closed, but when the furnace temperature has decreased to a value less than the set value, contacts 60 and 61 are closed; this latter position is shown in FIGURE 1. The switch in unit 58 is adjustable, temperature-wise, so that the temperature at which the above-described switch action occurs may be preset, or adjusted.

Contact 59 is connected to one end of the "raise" winding 41 of reversible motor 40, while contact 60 is connected through the contacts of a limit switch 63 to one end of the "lower" winding 42 of this same motor. One terminal of an alternating current power source 64 is connected to the common junction of windings 41 and 42, while the other terminal of this source is connected to the movable contact 61 of the switch in unit 58. Thus, when switch contacts 60 and 61 are closed, the "lower" motor winding 42 is energized from source 64, provided limit switch 63 is closed; when switch contacts 59 and 61 are closed, the "raise" motor winding 41 is energized from source 64.

In event the temperature at a critical point such as 55 exceeds the preset maximum value, the potential across the thermocouple 53 causes the switch contacts 59 and 61 in unit 58 to close. This energizes the "raise" winding 41 of motor 40. This motor, through its mechanical coupling to potentiometer arm 39, then raises this arm on potentiometer 37, to raise the oxygen set point. The second-described alternating current bridge then becomes unbalanced, producing an alternating current potential across potentiometer 43 which, through amplifier 44, results in the energization of motor 49. Motor 49 then drives the resistors 23 and 25 to unbalance the first-described alternating current bridge in such a direction as to produce an alternating current potential across potentiometer 27 which, through amplifier 28, results in the energization of the "open" damper motor winding 17. Damper motor 16 then opens the damper 14, to provide more excess air and thus alleviate the condition giving rise to the abnormal temperature increase. The action just described (occurring when the furnace overheats or exceeds a preset maximum temperature) occurs sufficiently rapidly to avoid damage to the furnace. It is not necessary that the damper be opened instantaneously when an excessive temperature condition occurs.

The limit switch 63 is actually physically located adjacent the potentiometer 37, and when arm 39 of this potentiometer is manually moved, to adjust the set point, the rotational relationship between the limit switch actuation and the slider or arm 39 is changed. Switch 63 is opened by a pin on the gear which is coupled between motor 40 and the potentiometer shaft, when arm 39 (in its movement by motor 40) tends to move below the manually set (preset) position of this arm. Switch 63 is closed at all other times.

It was previously assumed that the temperature had exceeded the preset maximum value, and it was explained how the damper 14 was opened, to alleviate this condition. When the furnace temperature (as sensed by thermocouples 53 or 54) has decreased to a value less than the set maximum value, the contacts in unit 58 reverse, opening contact 59 and closing contact 61 on contact 60. Since limit switch 63 is closed under these conditions, the "lower" winding 42 of motor 40 is now energized. The motor 40, through its clutch mechanism, then lowers arm 39 to its original position on potentiometer 37 (i.e., back to the original or manually adjusted set point), provided the preset maximum temperature is not exceeded in the process. Of course, if the preset maximum temperature is so exceeded, the thermocouple effects a reversal of the motor 40 to again raise the set point and open the damper, in the manner previously described. Assuming the preset maximum temperature is not again exceeded, the arm 39 is lowered back to the original set point. This lowering results in the energization of motor 49, which motor drives the resistors 23 and 25 in such a direction as to energize the "close" damper motor winding 18. Damper 14 is then closed, or returned to its original position.

Limit switch 63 is opened during the downward return of arm 39, thus preventing the reversible motor 40 from returning below the manually adjusted "set point" value, by opening the winding 42 of this motor as this point is reached.

The resistance of resistors 23 and 25 (which are controlled by motor 49) is a small percentage (e.g., 15–20 percent) of the total resistance of the damper slide-wire potentiometer 24. These resistors 23 and 25 are thus only large enough to compensate for changes in fuel heating value and in atmospheric pressure, and in addition to effectuate opening of the damper when the furnace temperature tends to become excessive. Since this relation of resistances holds, even if a failure occurred in the second-described bridge (i.e., in the oxygen analyzer and oxygen set point part of the system), there would be an error of only about 15 to 20 percent in the proper position of the damper 14. The damper 14 would, under these circumstances, be controlled only by the fuel firing rate, the rate of the fuel feed into the burner 7.

Reference will now be made to FIG. 2, which is a circuit schematic of a differential amplifier which may be used in the FIGURE 1 system. It will be described as amplifier 28, although it will be realized that identical circuitry can be used for amplifier 44. Speaking generally, this differential amplifier 28 responds to the phase and amplitude of an alternating current potential across the input potentiometer 27, to energize either a relay 66 or a relay 67, thereby to energize either the "open" winding 17 or the "close" winding 18 of the damper motor 16. Starting off in amplifier 28, two stages of alternating current amplification are provided in the twin triode tube 68. The signal is then fed in parallel to the grids of two triode structures contained in a tube 69, the anodes of these triodes being fed antiphaseally with raw alternating current from a source 70, by way of a transformer 71. Since the signal fed to the grids of these triodes is an alternating current signal of the same frequency as the alternating current on the anodes, only one of the two triode structures will conduct at any one time, the one conducting being that one whose anode is positive when the alternating current grid signal is of the proper polarity to bias the triodes to conduction. The winding of relay 66 is connected into the anode circuit of the left-hand triode structure, so this relay is energized (to close its contacts) when the left-hand triode structure conducts. The winding of relay 67 is connected into the anode circuit of the right-hand triode structure, so this latter relay is energized (to close its contacts) when the right-hand triode structure conducts. The normally-open contacts of relay 66 are in series between the alternating current power source 70 and "open" winding 17 of motor 16, so motor winding 17 is energized when relay 66 is energized. The normally-open contacts of relay 67 are in series between the power source 70 and "close" winding 18 of motor 16, so motor winding 18 is energized when relay 67 is energized.

The invention claimed is:

1. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, and means responsive to said third output and to said establishing means for effecting a control of said first output, thereby operating said positioning means to maintain the oxygen content of said combustion products normally approximately at said set point.

2. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, means responsive to said third output and to said establishing means for effecting a control of said first output, thereby operating said positioning means to maintain the oxygen content of said combustion products normally approximately at said set point, temperature-responsive means adapted to be placed in a heater, and means controlled by said temperature-responsive means for causing operation of said positioning means to increase the opening provided by said damper means when the temperature exceeds a predetermined value.

3. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, means responsive to said third output and to said establishing means for effecting a control of said first output, thereby operating said positioning means to maintain the oxygen content of said combustion products normally approximately at said set point, temperature-responsive means adapted to be placed in a heater, and means controlled by said temperature-responsive means for causing operation of said positioning means to increase the opening provided by said damper means when the temperature exceeds a predetermined value, and to decrease the opening provided by said damper means following such increase when said temperature drops below said predetermined value.

4. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, means responsive to said output and to said establishing means for effecting a control of said first output, thereby operating said positioning means to maintain the oxygen content of said combustion products normally approximately at said set point, temperature-responsive means adapted to be placed in a heater, means controlled by said temperature-responsive means for causing operation of said positioning means to increase the opening provided by said damper means when the temperature exceeds a predetermined value and to decrease the opening provided by said damper means following such increase when said temperature drops below said predetermined value; and means limiting the last-mentioned decrease of the damper opening.

5. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, said last-mentioned means being operable to vary said set point, means responsive to said third output and to said establishing means for effecting a control of said first output, thereby operating said positioning means to maintain the oxygen content of said combustion products normally approximately at said set point, temperature-responsive means adapted to be placed in a heater, and means controlled by said temperature-responsive means to operate said establishing means to vary the set point, thereby to control said first output and operate said positioning means to increase the opening provided by said damper means when the temperature exceeds a predetermined value.

6. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, said last-mentioned means being operable to vary said set point, means responsive to said third output and to said establishing means for effecting a control of said first output, thereby operating said positioning means to maintain the oxygen content of said combustion products normally approximately at said set point, temperature-responsive means adapted to be placed in a heater, and means controlled by said temperature-responsive means to operate said establishing means to raise the set point, thereby to control said first output and operate said positioning means to increase the opening provided by said damper means when the temperature exceeds a predetermined value.

7. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, said last-mentioned means being operable to vary said set point, means responsive to said third output and to said establishing means for effecting a control of said first output, thereby operating said positioning means to maintain the oxygen content of said combustion products normally approximately at said set point, temperature, responsive means adapted to be placed in a heater, and means controlled by said temperature-responsive means to operate said establishing means to raise the set point, thereby to control said first output and operate said positioning means to increase the opening provided by said damper means when the temperature exceeds a predetermined value, and to lower the set point following such raising when said temperature drops below said predetermined value.

8. Apparatus for control of a fuel-burning heater comprising damper means adapted to be located in the combustion air supply for a heater, means for adjustably positioning said damper means to control the heater combustion air supply, means controlled by said positioning means for producing a first output proportional to the opening provided by said damper means, means controlled by the flow of fuel into a heater for producing a second output proportional to the fuel flow rate, means responsive to changes in said second output for operating said damper positioning means to return the fuel-air ratio in a heater approximately to that existing before such a change, an oxygen analyzer adapted to be receptive of products of combustion from a heater and operating to produce a third output proportional to the oxygen content of said combustion products, means establishing a set point for oxygen content of said combustion products, said last-mentioned means being operable to vary said set point, means responsive to said third output and to said establishing means for effecting a control of said first output, thereby operating said positioning means to maintain the oxygen content of said combustion products normally approximately at said set point, temperature-responsive means adapted to be placed in a heater, means controlled by said temperature-responsive means to operate said establishing means to raise the set point, thereby to control said first output and operate said positioning means to increase the opening provided by said damper means when the temperature exceeds a predetermined value, and to lower the set point following such raising when said temperature drops below said predetermined value; and means limiting the last-mentioned lowering of the set point.

9. Apparatus for control of a fuel-burning heater comprising means for controlling the supply of combustion air to a heater, a balanceable bridge circuit having an output coupled to operate said controlling means; means controlled by flow of fuel to a heater for producing an output proportional to the fuel flow rate, means responsive to changes in said last-mentioned output for unbalancing said bridge, thereby to cause operation of said controlling means to return the fuel-air ratio in said heater approximately to that existing before such a change, an oxygen analyzer adapted to be receptive of products of combustion from a heater and operating to produce an output proportional to the oxygen content of said combustion products, means establishing a set point for oxygen content of said combustion products, means responsive to said last-mentioned output and to said establishing means for unbalancing said bridge, thereby to cause operation of said controlling means so as to maintain the oxygen content of said combustion products normally approximately at said set point, temperature-responsive means adapted to be placed in a heater, and means controlled by said temperature-responsive means, when the temperature exceeds a predetermined value, for unbalancing said bridge, thereby to cause operation of said controlling means to increase the air flow in a heater.

10. Apparatus as set forth in claim 9, wherein the means establishing a set point is operable to vary such point, and wherein the means controlled by said temperature-responsive means operates said establishing means to vary the set point.

11. Apparatus as set forth in claim 9, wherein the means establishing a set point is operable to vary such point, and wherein the means controlled by said temperature-responsive means operates said establishing means to raise the set point.

12. Apparatus as set forth in claim 9, wherein the means establishing a set point is operable to vary such point, and wherein the means controlled by said temperature-responsive means operates said establishing means to raise the set point, and to lower the set point following such raising when said temperature drops below said predetermined value.

13. Apparatus as set forth in claim 9, wherein the means establishing a set point is operable to vary such point, and wherein the means controlled by said temperature-responsive means operates said establishing means to raise the set point, and to lower the set point following such raising when said temperature drops below said predetermined value; said apparatus including also means limiting the last-mentioned lowering of the set point.

References Cited in the file of this patent

UNITED STATES PATENTS

| | | |
|---|---|---|
| 1,940,355 | Knapp | Dec. 19, 1933 |
| 2,052,375 | Wunsch et al. | Aug. 25, 1936 |
| 2,370,897 | Whitcomb | Mar. 6, 1945 |
| 2,420,415 | Bristol | May 13, 1947 |
| 2,980,334 | Geniesse | Apr. 18, 1961 |

OTHER REFERENCES

Greene: pages 121–128 of the Iron and Steel Engineer for March 1956.